(12) United States Patent
Ott

(10) Patent No.: US 11,927,669 B2
(45) Date of Patent: Mar. 12, 2024

(54) INDIRECT TIME OF FLIGHT RANGE CALCULATION APPARATUS AND METHOD OF CALCULATING A PHASE ANGLE IN ACCORDANCE WITH AN INDIRECT TIME OF FLIGHT RANGE CALCULATION TECHNIQUE

(71) Applicant: Melexis Technologies NV, Tessenderlo (BE)

(72) Inventor: Andreas Ott, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 800 days.

(21) Appl. No.: 17/016,861

(22) Filed: Sep. 10, 2020

(65) Prior Publication Data
US 2021/0088662 A1 Mar. 25, 2021

(30) Foreign Application Priority Data
Sep. 20, 2019 (EP) .................................... 19198797

(51) Int. Cl.
*G01S 17/36* (2006.01)
*G01S 7/4915* (2020.01)
*G01S 17/46* (2006.01)

(52) U.S. Cl.
CPC ............ *G01S 17/36* (2013.01); *G01S 7/4915* (2013.01); *G01S 17/46* (2013.01)

(58) Field of Classification Search
CPC ......... G01S 17/36; G01S 17/32; G01S 7/4915
See application file for complete search history.

(56) References Cited

U.S. PATENT DOCUMENTS

| 10,132,626 B2 * | 11/2018 | Steiner | ................. H04N 23/56 |
| 2013/0176445 A1 * | 7/2013 | Streeter | ................. G01S 17/36 348/208.1 |

(Continued)

OTHER PUBLICATIONS

Grunwald, "Investigation of Systematic Errors in Time-of-Flight Imaging," Graz University of Technology. (Year: 2013).*

(Continued)

*Primary Examiner* — Luke D Ratcliffe
*Assistant Examiner* — Zhengqing Qi
(74) *Attorney, Agent, or Firm* — HARNESS, DICKEY & PIERCE, P.L.C.

(57) ABSTRACT

An indirect time of flight range calculation apparatus comprises a light source, a photonic mixer that generates a plurality of output signals corresponding to a first plurality of phase values. A signal processor is also provided to calculate a first vector and a first angle from the first vector. The photonic mixer generates a second plurality of electrical output signals corresponding to a second plurality of phase values. Each phase value of the second plurality of phase values is respectively offset with respect to each phase value of the first plurality of phase values by a predetermined phase offset value. The signal processor processes the second plurality of electrical output signals in order to calculate a second vector, and de-rotates the second vector calculated and calculates a second angle from the de-rotated vector before offsetting the second angle against the first angle, thereby generating a corrected output angle.

20 Claims, 8 Drawing Sheets

(56) References Cited

U.S. PATENT DOCUMENTS

2017/0041589 A1* 2/2017 Patil .................. G01S 17/894
2021/0263137 A1* 8/2021 Dehlinger ............... G01S 7/484

OTHER PUBLICATIONS

Johannes Grünwald: "Master's Thesis Investigation of Systematic Errors in Time-of-Flight Imaging ", Jan. 4, 2013 (Jan. 24, 2013), XP55659576, Retrieved from the Internet: URL:http://www.diglib.tugraz.at/download.php ?id= 576a75768fdc2 &location= browse [retrieved on Jan. 20, 2020].

Drayton Benjamin M M et al: "Phase Algorithms for Reducing Axial Motion and Linearity Error in Indirect Time of Flight Cameras", IEEE Sensors Journal, IEEE Service Center, New York, NY, US, vol. 13, No. 9, Sep. 1, 2013 (Sep. 1, 2013), pp. 3386-3396, XP011523485, ISSN: 1530 -437X, DOI: 10.1109/JSEN.2013.2257737 [retrieved on Aug. 6, 2013].

Micha Feigin et al: "Modeling "wiggling" as a multi-path interference problem in AMCW ToF imaging", Optics Express, vol. 23, No. 15, Jul. 16, 2015 (Jul. 16, 2015), p. 19213, XP055550623, DOI: 10.1364/0E.23.019213.

European Search Report for European Application No. 19198798 dated Apr. 15, 2020.

* cited by examiner

INDIRECT TIME OF FLIGHT RANGE CALCULATION APPARATUS AND METHOD OF CALCULATING A PHASE ANGLE IN ACCORDANCE WITH AN INDIRECT TIME OF FLIGHT RANGE CALCULATION TECHNIQUE

FIELD

The present invention relates to an indirect time of flight range calculation apparatus of the type that, for example, employs phase delays to index measurements. The present invention also relates to a method of calculating a phase angle in accordance with an indirect time of flight technique, the method being of the type that, for example, employs phase delays to index measurements.

BACKGROUND

In so-called time-of-flight sensing systems and other systems, for example gaming console vision systems, it is known to employ an illumination source to illuminate a surrounding environment within a field of view of the illumination source, sometimes known as a "scene", and process light reflected by features of the scene. Such so-called LiDAR (Light Detection And Ranging) systems illuminate a scene with light using the illumination source, and detect light reflected from an object in the scene using a detection device, for example an array of photodiodes, some optical elements and a processing unit. Light reflected from the object in the scene is received by the detection device and converted to an electrical signal, which is then processed by the processing unit by application of a time-of-flight (ToF) calculation in order to determine the distance of the object from the detection device. Although different varieties of LiDAR system are known to be based upon different operating principles, such systems nevertheless essentially illuminate a scene and detect reflected light.

In this regard, the so-called "Flash LiDAR" technique, which is a direct ToF ranging technique, employs a light source that emits pulses of light that are subsequently reflected by features of the scene and detected by a detector device. In such a technique, the distance to a reflecting feature is calculated directly using a measured time for a pulse of light to make a round trip to the reflecting feature and back to the detector device. The pulses of light incident upon the detector devices are sampled in the time domain at a very high sampling rate. The signal path in the processing circuitry to implement such a technique therefore requires a high bandwidth for signals as well as a large silicon "real estate", i.e. such an implementation requires a relatively large area on a silicon wafer, which in turn limits the number of channels that can be supported on an integrated circuit. The practical spatial number of channels that such Flash LiDAR sensors can support is therefore usually below 100. To overcome this limitation, mechanical scanning systems are implemented requiring moving components.

Another known LiDAR system employs a so-called "indirect Time of Flight" (iToF) ranging technique. iTOF systems emit a continuous wave light signal and reflections of the continuous wave light signal are received by a detector device and analysed. Multiple samples, for example four samples, of the light reflected from a feature of the scene are taken, each sample being phase stepped by, for example, 90°. Using this illumination and sampling approach, a phase angle between illumination and reflection can be determined, and the determined phase angle can be used to determine a distance to the reflecting feature of the scene.

In iToF systems, high frequency signal processing (demodulation) occurs at the pixel level, and so the signal bandwidth post-pixel required to integrate a large number of pixels on the same chip is low. Consequently, iToF systems can support a larger number of channels and hence higher spatial resolution measurement than direct ToF systems. However, iToF systems have limited distance measurement capabilities. In this regard, to achieve low stochastic distance measurement errors, iToF systems require high modulation frequencies, which in turn lowers the distance range that can be measured unambiguously. For example, a 100 MHz modulation frequency results in an approximate unambiguous measurement range of 1.5 m. Also, a conventional iToF system is susceptible to errors due to multiple reflections and multiple propagation paths.

As explained above, iToF systems sample in respect of different applied phases. A typical iToF system comprises a buffer that stores analogue signals generated by a so-called photonic mixer device in respect of m phases employed for subsequent signal processing. A discrete Fourier transformation unit calculates a fundamental frequency of a complex signal stored by the buffer in terms of in-phase and quadrature components of the signals. Using the values of the in-phase and quadrature components, a phase angle of the complex signal and the amplitude can be calculated and the distance to an object can be solved using the phase angle information.

However, such amplitude modulated continuous wave type systems suffer from an inherent depth measurement error due to aliasing of the emitted light signal versus a reference signal correlation function. This is due to higher harmonics present in both the emitted light signal and the reference signal, which are not accounted for in modelling or measurement. This kind of error is known as wiggling or circular errors (see "Modeling "wiggling" as a multi-path interference problem in AMCW ToF imaging", Feigin et al., OSA Optics Express, 2015).

U.S. Pat. No. 10,132,626 B2 and the Master's thesis entitled "Investigation of Systematic Errors in Time-of-Flight Imaging" (Johannes Grünwald, Graz University of Technology, Austria, Jan. 24, 2013) propose a solution to improve accuracy of phase estimates by removing aliasing attributable to odd harmonics. This is achieved by taking two consecutive sets of measurements shifted by half of the sampling angle, which is the inverse of the number of equally spaced measurement phase samples per cycle, i.e. $2\pi/m$. A first I/Q vector is calculated in respect of the measurements made without the phase shift, and a second I/Q vector is calculated in respect of the measurements made using the phase shift, the second I/Q vector being de-rotated. The first and second vectors are combined directly before the phase angles and amplitudes of the combined I/Q vector are calculated. The theoretical benefit of this approach is to achieve a level of circular errors in an even-phase sample measurement that approximates that of a measurement system of twice the number of measurement phase samples, for example a 4-phase sampling system almost has the wiggling performance of an 8-phase sampling system.

However, any differences in amplitudes, either by amplitude circular error or by amplitude fluctuations between the measurements, directly influence the accuracy of the extracted phase angle.

Additionally, in this approach, the number of phase samples to be acquired is overall 2×m, and while the distance and angle measurement accuracies are equal to a measurement where 2×m phase sample acquisitions are performed consecutively for one distance and angle measurement, the apparent benefit of achieving similar performance to a sampling system of, for example, double the number of samples without doubling the number of samples taken by the system is not achieved, because in practice the thesis mentioned above proposes an 8-phase sampling system. Also, this approach is susceptible to so-called "ghost" images, where moving objects or parts thereof can appear in different positions in the scene between the first and second measurement. Also, movement of an object in a scene can introduce errors into distance calculations being made from measurements made in iToF systems.

SUMMARY

According to a first aspect of the present invention, there is provided a phase angle calculation apparatus comprising: a light source configured to emit light in accordance with an indirect time of flight measurement technique; a photonic mixer cell configured to generate and store a plurality of electrical output signals respectively corresponding to a first plurality of predetermined phase values applied in accordance with the indirect time of flight measurement technique; a signal processing circuit configured to process the first plurality of electrical output signals in accordance with the indirect time of flight measurement technique in order to calculate a first vector and a first angle from the first vector; wherein the photonic mixer cell is configured to generate and store a second plurality of electrical output signals corresponding to a second plurality of predetermined phase values applied in accordance with the indirect time of flight measurement technique; each phase value of the second plurality of predetermined phase values is respectively offset with respect to each phase value of the first plurality of predetermined phase values by a predetermined phase offset value; the signal processing circuit is configured to process the second plurality of electrical output signals in accordance with the indirect time of flight measurement technique in order to calculate a second vector; and the signal processing circuit is further configured to de-rotate the second vector calculated and calculate a second angle from the de-rotated second vector, and to offset the second angle calculated against the first angle calculated, thereby generating a corrected output angle.

The signal processing circuit may comprise: a Digital Fourier Transform unit configured to generate a de-rotated output signal in respect of a fundamental frequency from the second plurality of electrical output signals; and an angle calculator may be configured to calculate the second angle using the de-rotated output signal.

The de-rotated output signal may comprise an in-phase component and a quadrature component.

The signal processing circuit may comprise: a Digital Fourier Transform unit configured to receive the first plurality of electrical output signals and to generate a first output signal in respect of a fundamental frequency from the first plurality of electrical output signals, and to receive the second plurality of electrical output signals and to generate a second output signal in respect of a fundamental frequency from the second plurality of electrical signals; and a vector de-rotator may be operably coupled to the Digital Fourier Transform unit and configured to receive the second output signal and to de-rotate the second output signal.

The signal processing circuit may be configured to generate a plurality of calculated angles; the plurality of calculated angles may comprise an alternation of angles calculated using the first plurality of predetermined phase values and the second plurality of predetermined phase values; and the plurality of calculated angles may comprise the first angle and the second angle.

The apparatus may further comprise: an angle correction unit configured to provide a plurality of corrected output angles; the angle correction unit may also be configured to receive serially the plurality of calculated angles and to combine pairs of temporally adjacent calculated angles of the plurality of calculated angles.

The angle correction unit may comprise a frame buffer configured to delay the plurality of calculated angles, and may thereby provide a plurality of delayed calculated angles separate from the plurality of calculated angles and arranged with the plurality of calculated angles in parallel lockstep pairs.

For each lockstep pair of a calculated angle and a delayed calculated angle, one of the calculated angle and delayed calculated angle may constitute an angular correction.

A summation unit may combine each lockstep pair of the plurality of calculated angles and the plurality of delayed calculated angles.

The angle correction unit may further comprise: a scaling unit configured to scale each combined pair of temporally adjacent calculated angles of the plurality of calculated angles.

The apparatus may further comprise a summation unit having a first input operably coupled to an output of the frame buffer and a second input operably coupled to an output of the signal processing circuit; and a scaling unit that may have an input operably coupled to an output of the summation unit, thereby providing the plurality of corrected output angles at an output thereof. The plurality of corrected angles may comprise the corrected output angle.

The scaling unit may be a divider. The summation unit and the scaling unit may serve to calculate an average of each lockstep pair of the lockstep pairs of the plurality of calculated angles and the plurality of delayed calculated angles.

The signal processing circuit may be configured to calculate the first angle in the complex plane. The signal processing circuit may be configured to calculate the second angle in the complex plane.

The predetermined phase offset value may be T/m, where m may be a number of phase angle values of the first plurality of predetermined phase values.

The signal processing circuit may be configured to generate a plurality of calculated amplitudes; the plurality of calculated amplitudes may comprise an alternation of amplitudes calculated using the first plurality of predetermined phase values and the second plurality of predetermined phase values; and the apparatus may further comprise: an amplitude correction unit that may be configured to receive the plurality of calculated amplitudes and to combine pairs of temporally adjacent calculated amplitudes of the plurality of calculated amplitudes.

The amplitude correction unit may comprise another frame buffer configured to delay the plurality of calculated amplitudes, and thereby may provide a plurality of delayed calculated amplitudes separate from the plurality of calculated amplitudes and arranged with the plurality of calculated amplitudes in parallel lockstep pairs.

The angle correction unit may be configured to calculate differences between temporally adjacent pairs of the plurality of calculated angles to provide a plurality of angular error values; and the signal processing circuit may be configured to generate a plurality of calculated amplitudes; the plurality of calculated amplitudes may comprise an alternation of amplitudes calculated using the first plurality of predetermined phase values and the second plurality of predetermined phase values; and the apparatus may further comprise: an amplitude correction unit configured to receive the plurality of calculated amplitudes and to correct each of the plurality of calculated amplitudes respectively in response to the plurality of angular error values; the plurality of angular error values may be calculated substantially in synchronism with the plurality of calculated amplitudes.

The apparatus may further comprise: a lookup table comprising a plurality of amplitude correction values referenced with respect to a plurality of angular error values; the lookup table may be configured to be accessed to obtain an amplitude correction value from the plurality of amplitude correction values in response to an angular error value of the plurality of angular error values.

The plurality of amplitude correction values may comprise a first amplitude correction value and a second amplitude correction value; the first and second amplitude correction values may correspond to an angular error value of the plurality of angular error values; and the apparatus may further comprises: an interval calculator configured to receive the plurality of corrected output angles and to calculate a plurality of selection values in response thereto; and the interval calculator may also be configured to exclude one of the first amplitude correction values and the second amplitude correction values in response to a selection value of the plurality of selection values.

The angle correction unit may be configured to generate a plurality of output angles; the angle correction unit may be configured to calculate a measure of inter-frame motion and to compare the measure of inter-frame motion with a predetermined motion threshold; and the angle correction unit may be configured to generate an output angle of the plurality of output angles by selecting as the output angle between a corrected output angle of the plurality of corrected output angles and a substantially contemporaneously available calculated angle of the plurality of calculated angles used to calculate the corrected output angle in response to the comparison of the measure of inter-frame motion with the predetermined motion threshold.

The angle correction unit may be configured to calculate the measure of inter-frame motion by calculating a difference between the corrected output angle and a preceding output angle of the plurality of output angles that immediately preceded the output angle.

The angle correction unit may comprise a further frame buffer to store temporarily the preceding output angle.

The signal processing circuit may be configured to generate a plurality of calculated amplitudes; the plurality of calculated amplitudes may comprise an alternation of amplitudes calculated using the first plurality of predetermined phase values and the second plurality of predetermined phase values; and the apparatus may further comprise: an amplitude correction unit configured to receive the plurality of calculated amplitudes and to calculate a plurality of corrected output amplitudes by combining pairs of temporally adjacent calculated amplitudes of the plurality of calculated amplitudes; and wherein the amplitude correction unit may be configured to select between a corrected output amplitude of the plurality of corrected output amplitudes and a substantially contemporaneous calculated amplitude of the plurality of calculated amplitudes used to calculate the corrected output amplitude; the selection may be in response to the comparison of the measure of inter-frame motion with the predetermined motion threshold.

According to a second aspect of the invention, there is provided an indirect time of flight range calculation apparatus comprising the phase angle calculation apparatus as set forth above in relation to the first aspect of the invention; wherein the signal processing circuit is configured to calculate a range using the corrected output angle.

According to a third aspect of the invention, there is provided a method of calculating a phase angle in accordance with an indirect time of flight range calculation technique, the method comprising: a light source emitting light in accordance with the indirect time of flight measurement technique; a photonic mixer cell generating and storing a first plurality of electrical output signals respectively corresponding to a first plurality of predetermined phase values applied in accordance with the indirect time of flight measurement technique; a signal processing resource processing the first plurality of electrical output signals in accordance with the indirect time of flight measurement technique in order to calculate a first vector and a first angle from the first vector; the photonic mixer cell generating and storing a second plurality of electrical output signals corresponding to a second plurality of predetermined phase values applied in accordance with the indirect time of flight measurement technique; the signal processing resource processing the second plurality of electrical output signals in accordance with the indirect time of flight measurement technique in order to calculate a second vector; the signal processing resource de-rotating the second vector calculated and calculating a second angle from the de-rotated second vector, and to offset the second angle calculated against the first angle calculated in order to generate a corrected output angle; wherein each phase value of the second plurality of predetermined phase values is respectively offset with respect to each phase value of the first plurality of predetermined phase values by a predetermined phase offset value.

It is thus possible to provide an apparatus and method that is capable of generating calculated angles with improved accuracy when calculated in accordance with an indirect time of flight measurement technique. The angles calculated are less susceptible to the effects of harmonics in a continuous wave illumination signal, especially in cases where the harmonic content is large. Additionally, the apparatus and method possess greater immunity to motion, thereby resulting in a reduction in motion artefacts when imaging.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
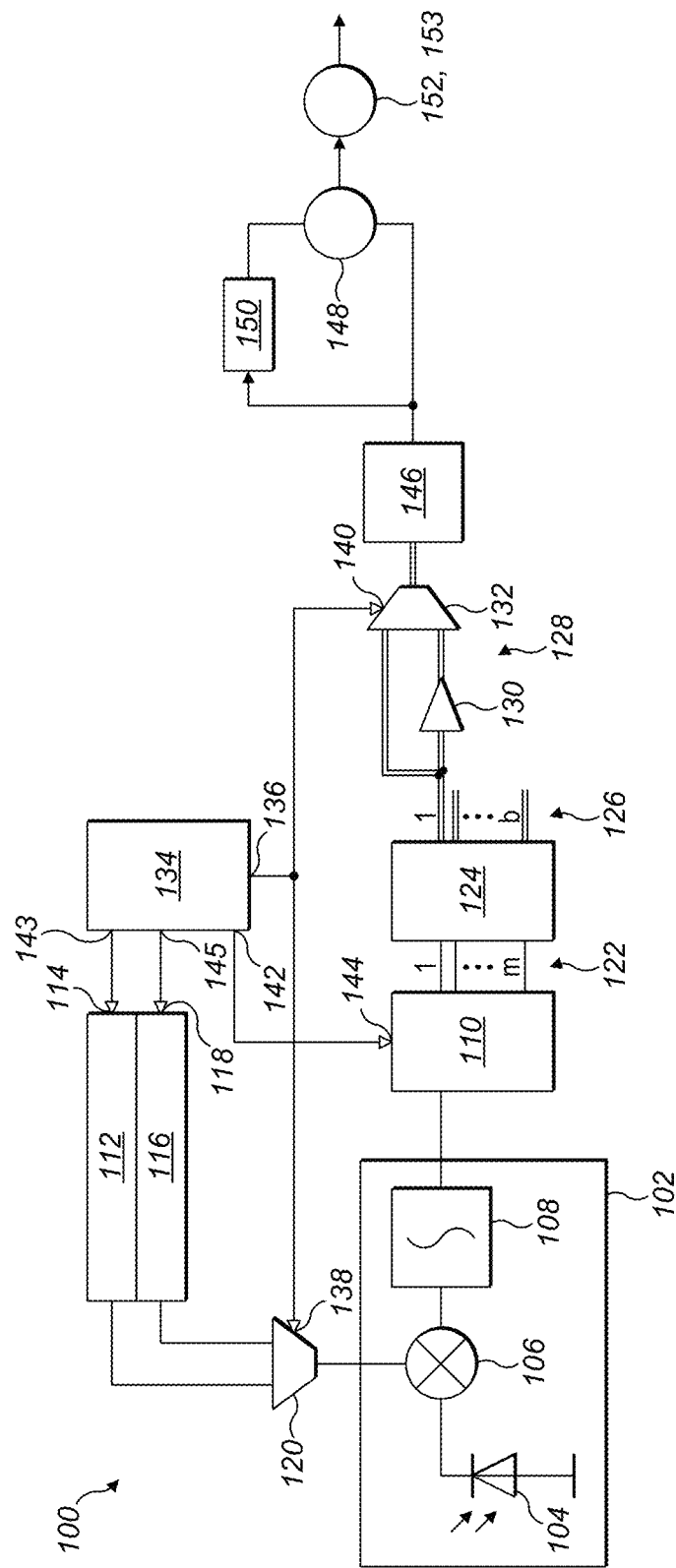
FIG. 1 is a schematic diagram of an indirect time of flight range calculation apparatus constituting an embodiment of the invention.

Throughout the following description, identical reference numerals will be used to identify like parts.

Referring to FIG. 1, an indirect time of flight range calculation apparatus 100 comprises a source of electromagnetic radiation (not shown), for example a Laser Diode (LD) or a Light Emitting Diode (LED). In this example, the source of electromagnetic radiation is infrared light that is amplitude modulated in accordance with an indirect time of flight measurement technique so as to be emitted as a continuous wave light signal. A detection and ranging module of the apparatus comprises an optical receiver photonic mixer pixel device 102, the optical receiver photonic mixer pixel device 102 comprising a photodiode 104 having an anode operably coupled to ground potential and a cathode coupled a first input of a photonic mixer 106, an output of the photonic mixer 106 being coupled to an input of an integrator 108. An output of the integrator 108 is coupled to an input of a phase buffer 110. In this example, a single photonic mixer pixel device 102 is being described for the sake of conciseness and clarity of description. However, the skilled person will appreciate that the detection and ranging module comprises an array of photonic mixer pixel devices of the kind described above.

A first phase signal generator 112 is configured to generate a first continuous wave electrical signal. The phase of the first continuous wave signal is selected via a first control input 114, the phase of the first continuous wave signal being selectable from a first set of phases: $[p_1, p_2, \ldots, p_m]$. A second phase signal generator 116 is configured to generate a second continuous wave electrical signal. The phase of the second continuous wave signal is selected via a second control input 118, the phase of the second continuous wave signal being selectable from a second set of phases: $[p_1, p_2, \ldots, p_m]+\pi/m$. Each phase value of the second set of phases is respectively offset with respect to each phase value of the first set of phases. A first output of the first signal generator 112 is coupled to a first input of a first multiplexer 120 and an output of the second signal generator 116 is coupled to a second input of the first multiplexer 120.

The phase buffer 110 provides a plurality of phase measurement outputs 122 representing respective accumulated charge levels for applied phase values in respect of the photonic mixer pixel device 102. In this example, the phase buffer 110 comprises m outputs 122, one in respect of each applied phase value. The plurality of outputs 122 are coupled to respective inputs of a Digital Fourier Transform (DFT) unit 124, which has a plurality of digital in-phase (I)/quadrature (Q) outputs 126. In this example, the DFT unit 124 comprises b pairs of digital I/Q outputs corresponding to different harmonics of measured signals. As the output of the integrator 108 is an accumulated charge and, in this example in the analogue domain, the output of the integrator 108 needs to be converted to the digital domain before storage by the phase buffer 110. This can be achieved, for example, by employing a photon counter as the integrator 108 or providing an analogue-to-digital converter before or after the phase buffer 110.

A first pair of I/Q outputs of the plurality of digital I/Q outputs 126, relating to the first harmonic of the received reflected optical signal, is coupled to a vector de-rotation unit 128. The vector de-rotation unit 128 is configured to de-rotate selectively electrical signals received. In this regard, the first pair of digital I/Q outputs 126 is operably coupled to a de-rotator 130 as well as a first input of a second multiplexer 132, an output of the de-rotator 130 being coupled to a second input of the second multiplexer 132. In this example, the DFT unit 124 and the vector de-rotation unit 128 constitute a signal processing circuit.

A timing control unit 134 has a first synchronisation output 136 operably coupled to a first synchronisation input 138 of the first multiplexer 120 and a second synchronisation input 140 of the second multiplexer 132. The timing control unit 134 also has a second synchronisation output 142 that is operably coupled to a synchronisation input 144 of the phase buffer 110. A first control output 143 and a second control output 145 of the timing control unit 134 are respectively coupled to control inputs of the first signal generator 112 and the second signal generator 114.

An output of the second multiplexer 132 in respect of a fundamental frequency is coupled to an input of an arctan unit 146, for example an atan2 unit. An output of the arctan unit 146 is coupled to a first input of a first summation unit 148. The output of the arctan unit 146 is also coupled to an input of a first delay unit 150, constituting a frame buffer, an output of the first delay unit 150 being coupled to a second input of the first summation unit 148. The first summation unit 148 constitutes a combiner. An output of the first summation unit 148 is operably coupled to an input of a first divider 152, constituting a scaling unit 153, having an output for providing a corrected angle.

In this example, the signal processing circuit also comprises the arctan unit 146, the first summation unit 148, the first frame buffer 150 and the first divider 152.

Figure 2:
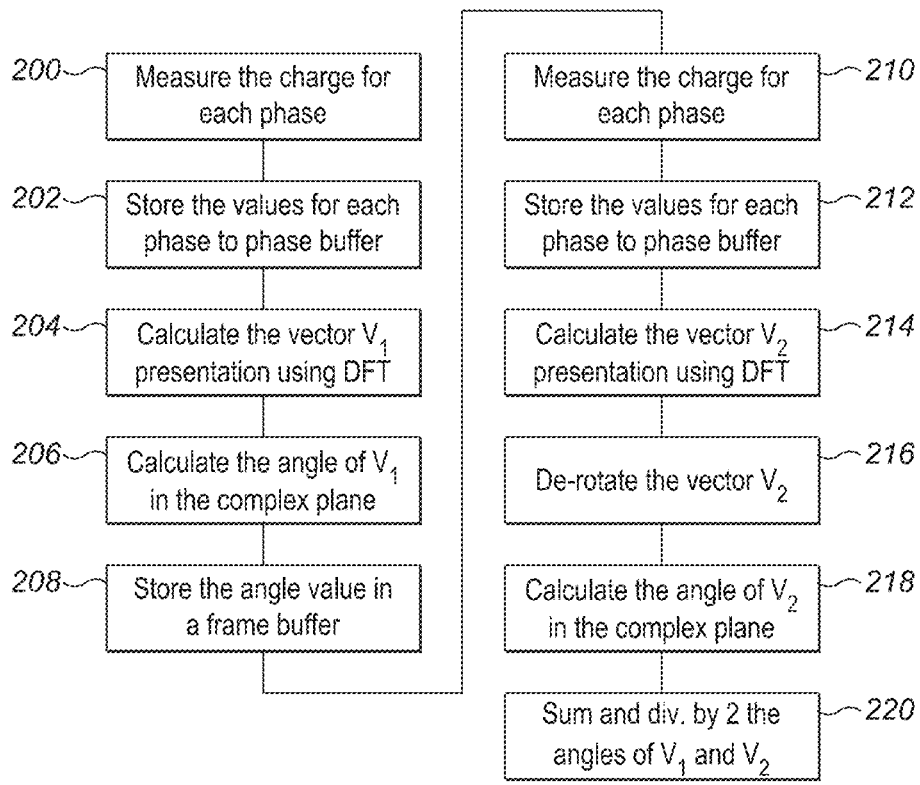
FIG. 2 is a flow diagram of a method of calculating a phase angle in accordance with an indirect time of flight technique performed by the apparatus of FIG. 1 and constituting another embodiment of the invention.

In operation (FIG. 2), the light source emits a continuous wave optical signal that illuminates a scene. An object in the scene reflects the emitted optical signal. The first and second signal generators respectively generate a first continuous wave electrical signal and a second continuous wave electrical signal, the timing control unit 134 controlling cycling through the first set of phases in respect of the first electrical signal relative to the continuous wave optical signal and cycling through the second set of phases in respect of the second electrical signal relative to the continuous wave optical signal. A first synchronisation signal applied by the first synchronisation output 136 to the first multiplexer 120 controls application of the first electrical signal or the second electrical signal to the photonic mixer 106.

Figure 3:
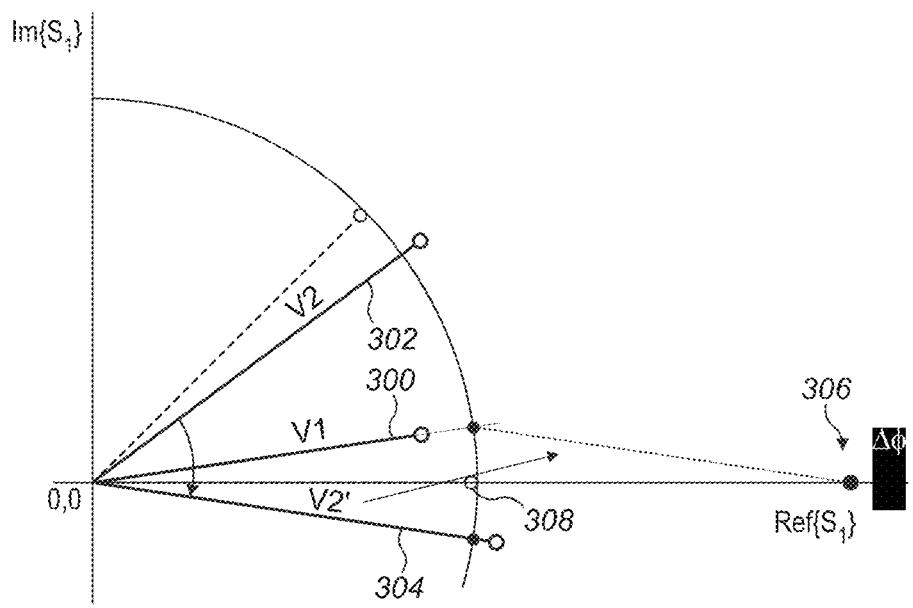
FIG. 3 is a schematic diagram of a vector combination in the complex plane in relation to the method of FIG. 2.

In order to calculate a corrected angle, a first phase angle is calculated by applying the first electrical signal to the photonic mixer 106 and the phase of the first electrical signal is cycled through the first set of phases and the charges stored in the integrator 108 in respect of each phase of the first set of phases are measured (Step 200) and stored (Step 202) by the phase buffer 110. The phase buffer 110 effectively performs a serial-to-parallel conversion of the electrical measurement signals originating from the integrator 108. The first electrical measurements are acquired by the DFT unit 124 and converted to a vector (Step 204) representing the phase and angle of the analogue electrical measurements in respect of the fundamental frequency, thereby yielding a first measurement vector, $V_1$, 300 (FIG. 3). The DFT unit 124 can also generate other I/Q vectors in respect of harmonics of the measured charges by the integrator 108. After the first electrical measurement signals are converted to the frequency domain, the I- and Q-values for the fundamental frequency are provided by the DFT unit 124 at the outputs thereof. In this example, the first synchronisation signal ensures that the fundamental frequency I/Q outputs of the current measurement frame of the DFT unit 124 pass through the vector de-rotation unit 128 without undergoing de-rotation and are received by the arctan unit 146. The arctan unit 146 then, in accordance with the indirect time of flight measurement technique, calculates (Step 206) an angle of the first vector, $V_1$, constituting a first calculated angle, $\varphi_1$, in the complex plane from the fundamental frequency I and Q values. The first calculated angle, $\varphi_1$, is then stored (Step 208) by the first delay unit 150.

In an immediately subsequent measurement time frame, a second phase angle is then calculated by applying the second electrical signal to the photonic mixer 106 by way of a control signal applied to the first multiplexer by the timing control unit 134, and the phase of the second electrical signal is cycled through the second set of phases, which are shifted by ±Trim, and the charges stored in the integrator 108 in respect of each phase of the second set of phases are measured (Step 210) and stored (Step 212) by the phase buffer 110. The first electrical measurements are acquired by the DFT unit 124 and converted to a vector (Step 214) representing the phase and angle of the electrical measurements, thereby yielding a second measurement vector, $V_2$, 302 (FIG. 3). After the second electrical measurement signals are converted to the frequency domain, the I- and Q-values for the fundamental frequency are provided by the DFT unit 124 at the outputs thereof. The first synchronisation signal ensures that the first output of the DFT unit 124 associated with the first harmonic of the received reflected optical signal, which is processed by the de-rotator 130 (Step 216) of the vector de-rotation unit 128, passes through the angle de-rotation unit 130 in preference to the first output of the DFT unit 124, which is also coupled to the first input of the second multiplexer 132 and does not undergo de-rotation. The vector de-rotation unit 128 therefore provides a de-rotated second vector, $V_2'$, 304, to the arctan unit 146. The arctan unit 146 then, in accordance with the indirect time of flight measurement technique, calculates (Step 218) an angle of the second de-rotated vector, $V_2'$, constituting a second calculated angle, $\varphi_2$, in the complex plane from the fundamental frequency I and Q values.

The second calculated angle, $\varphi_2$, is then combined by the summation unit 148 with the first calculated angle, $\varphi_1$, stored in the first frame buffer 150. The content of the first frame buffer 150 and each calculated angle generated by the arctan unit 146 are applied to the summation unit 148 as parallel lockstep pairs on a per measurement time frame basis. The sum (Step 220) of the first and second calculated angles, $\varphi_1$, $\varphi_2$, is then scaled (Step 220) by the first divider 152, which in this example divides the sum of the first and second calculated angles, $\varphi_1$, $\varphi_2$, by 2. In combination, the first summation unit 148 and the first divider 152 calculate the average of the first and second calculated angles, $\varphi_1$, $\varphi_2$. The output of the first divider 152 therefore yields a corrected first angle. At the end of the current measurement frame cycle or at the beginning of the next measurement frame cycle, the content of the first frame buffer 150 is replaced with immediately previously calculated angle, for example at this stage of the processing the second calculated angle, $\varphi_2$, for compensation in the next measurement frame cycle.

The above steps (Steps 200 to 220) are repeated until correction of calculated angles is no longer required. In this regard, the above process alternates between using a stored angle of a de-rotated vector to apply a correction to an angle of a vector that has not been de-rotated, and an angle of a de-rotated vector that is used to apply a correction to a stored angle of a vector that has not been de-rotated. As such, the signal processing circuit generates a plurality of calculated angles, the plurality of calculated angles comprising an alternation of angles calculated using the first plurality of phase values and the second plurality of phase values. Temporally adjacent calculated angles are received serially and combined in pairs. Referring to FIG. 3, the sum 306 of the first and second calculated angles, $\varphi_1$, $\varphi_2$, possesses an angular error of $\Delta\varphi_1$, the point 308 representing the averaged first and second calculated angles, $\varphi_1$, $\varphi_2$. The alternating calculations over a number of measurement frame cycles is shown in Table I below.

TABLE I

| Calc. # | Acquisition phase samples | Arctan | Buffer | Phase angle output |
|---|---|---|---|---|
| 1 | $[p_1\ p_2 \ldots p_m]$ | $\phi(V_{1(0)})$ | — | — |
| 2 | $[p_1\ p_2 \ldots p_m] \pm \pi/m$ | $\phi(V_{2(0)}')$ | $\phi(V_{1(0)})$ | $(\phi(V_{1(0)}) + \phi(V_{2(0)}'))/2$ |
| 3 | $[p_1\ p_2 \ldots p_m]$ | $\phi(V_{1(1)})$ | $\phi(V_{2(0)}')$ | $(\phi(V_{1(1)}) + \phi(V_{2(0)}'))/2$ |
| 4 | $[p_1\ p_2 \ldots p_m] \pm \pi/m$ | $\phi(V_{2(1)}')$ | $\phi(V_{1(1)})$ | $(\phi(V_{1(1)}) + \phi(V_{2(1)}'))/2$ |
| 5 | $[p_1\ p_2 \ldots p_m]$ | $\phi(V_{1(2)})$ | $\phi(V_{2(1)}')$ | $(\phi(V_{1(2)}) + \phi(V_{2(1)}'))/2$ |

As can be seen, during successive measurement time frames, for each lockstep pair of a calculated angle and a delayed calculated angle, one of the calculated angle and delayed calculated angle constitutes an angular correction for the other, because the frame buffer alternately stores angles calculated in relation to the first set of phase values and the second set of phase values.

Figure 4:
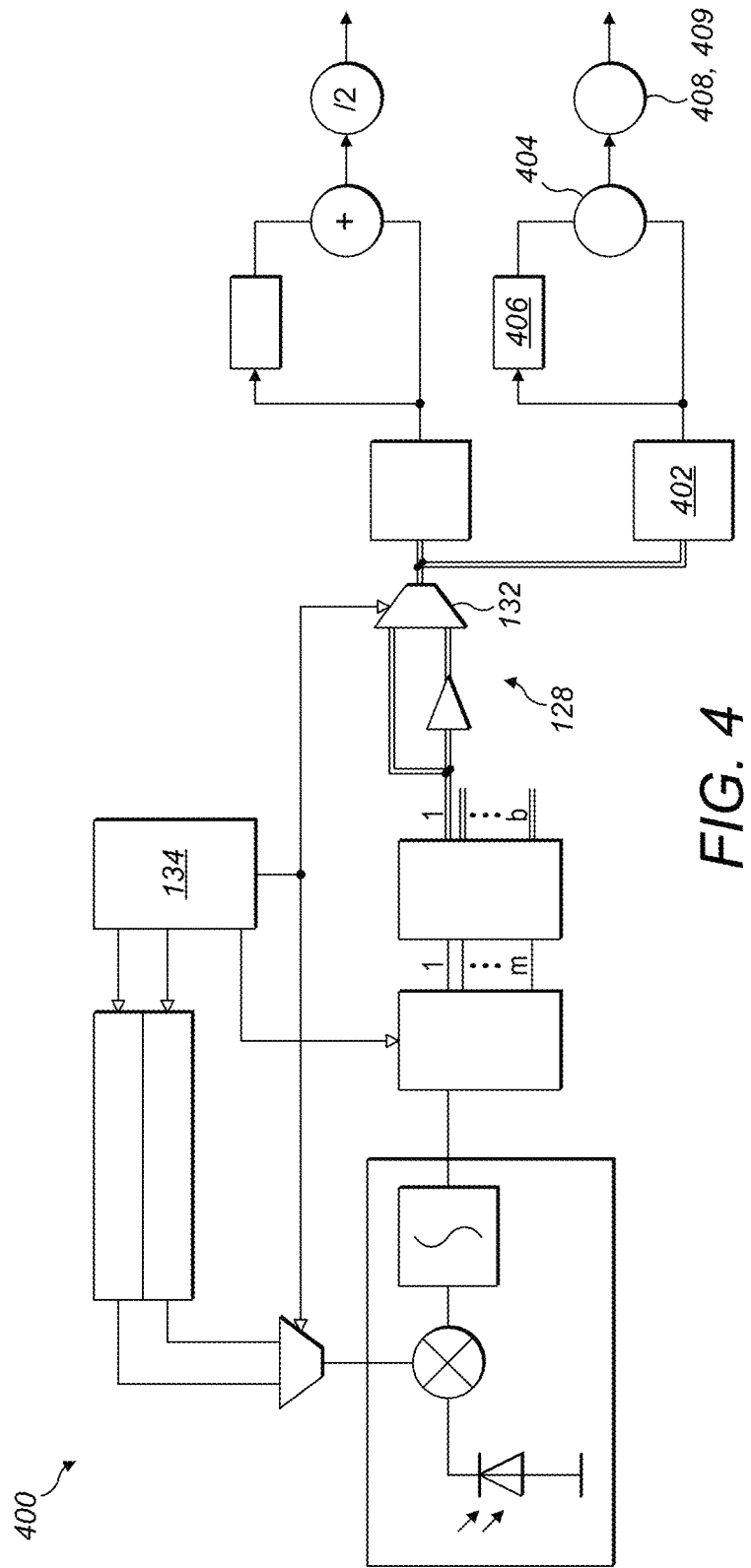
FIG. 4 is a schematic diagram of a modification to the apparatus of FIG. 1 and constituting a further embodiment of the invention.

In another example (FIG. 4), another apparatus 400 corrects amplitude information calculated by employing the same principle as described above in relation to the calculation of corrected angles. The apparatus 100 of FIG. 1 is, in this example, modified by coupling an input of a magnitude calculator 402 to the I/Q outputs of the vector de-rotation unit 128, in particular the outputs of the second multiplexer 132. An output of the magnitude calculator 402 is coupled to a first input of a second summation unit 404. The output of the magnitude calculator 402 is also coupled to an input of a second delay unit 406, constituting a second frame buffer, an output of the second delay unit 406 being coupled to a second input of the second summation unit 404. The second summation unit 404 constitutes a combiner. An output of the second summation unit 404 is operably coupled to an input of a second divider 408, constituting a scaling unit 409, having an output for providing a corrected amplitude. However, the skilled person should appreciate that the second divider 408 can be omitted in other examples and the output of the second summation unit 404 can be scaled in a subsequent processing stage of the apparatus 100, which can be part of the apparatus 100 or another processing resource coupled to the apparatus 100.

In operation, the apparatus 400 operates in a like manner to the apparatus 100 of FIG. 1, but the additional elements of the apparatus 400 serve to provide the following addition functionality in parallel with the angle correction functionality of FIG. 1.

In order to calculate a corrected amplitude, a first amplitude of the first measurement vector, $V_1$, 300 (FIG. 3) is calculated from the output of the second multiplexer 132, the first vector, $V_1$, having passed through the vector de-rotation unit 128 without undergoing de-rotation. The first measurement vector, $V_1$, is therefore received by the magnitude calculator 402 and the magnitude calculator 402 calculates a magnitude of the first vector, $V_1$, constituting a first calculated amplitude, $A_1$, in the complex plane from the fundamental frequency I and Q values received. The first calculated amplitude, $A_1$, is then stored by the second delay unit 406.

A second amplitude is then calculated by obtaining the de-rotated second measurement vector, $V_2'$, 302 (FIG. 3) from the output of the second multiplexer 132, the second vector, $V_2$, provided by the DFT unit 124 having been de-rotated by the de-rotator 130 of the vector de-rotation unit 128. The magnitude calculator 402 calculates a magnitude of the de-rotated second vector, $V_2'$, constituting a second calculated amplitude, $A_2$, in the complex plane from the fundamental frequency I and Q values of the de-rotated second measurement vector, $V_2'$, obtained.

The second calculated amplitude, $A_2$, is then combined by the second summation unit 404 with the first calculated amplitude, $A_1$, stored in the second frame buffer 406, and the content of the second frame buffer 406 is replaced with the second calculated amplitude, $A_2$, for compensation in the next measurement frame cycle. The content of the second frame buffer 406 and each calculated amplitude generated by the magnitude calculator 402 are applied to the second summation unit 404 as parallel lockstep pairs on a per measurement time frame basis. The sum of the first and second calculated amplitudes, $A_1$, $A_2$, is then scaled by the second divider 408, which in this example divides the sum of the first and second calculated amplitudes, $A_1$, $A_2$, by 2. In combination, the second summation unit 404 and the second divider 408 calculate the average of the first and second calculated amplitudes, $A_1$, $A_2$. The output of the second divider 408 therefore yields a corrected first amplitude.

The above steps in respect of the above-described elements of the apparatus 400 are repeated until correction of calculated angles and amplitudes is no longer required. In this regard, the above process alternates between using a stored amplitude of a de-rotated vector to apply a correction to an amplitude of a vector that has not been de-rotated, and an amplitude of a de-rotated vector that is used to apply a correction to a stored amplitude of a vector that has not been de-rotated. As such, the signal processing circuit generates a plurality of calculated amplitudes, the plurality of calculated amplitudes comprising an alternation of amplitudes calculated using the first plurality of phase values and the second plurality of phase values. Temporally adjacent amplitudes are received serially and combined in pairs. Referring to FIG. 3, the point 306 represents the sum of the first and second calculated vectors, possessing a first amplitude, $A_1$, and a second amplitude, $A_2$, respectively. The point 308 represents the averaged first and second calculated vectors. The alternating calculations over a number of frame cycles is shown in Table II below.

TABLE II

| Calc. # | Acquisition phase samples | Arctan | Buffer | MAG | Phase output | Amplitude output |
|---|---|---|---|---|---|---|
| 1 | $[p_1\ p_2 \ldots p_m]$ | $\phi(V_{1(0)})$ | — | $A(V_{1(0)})$ | — | — |
| 2 | $[p_1\ p_2 \ldots p_m] \pm \pi/m$ | $\phi(V_{2(0)}')$ | $\phi(V_{1(0)})$ | $A(V_{2(0)}')$ | $(\phi(V_{1(0)}) + \phi(V_{2(0)}'))/2$ | $(A(V_{1(0)}) + A(V_{2(0)}'))/2$ |
| 3 | $[p_1\ p_2 \ldots p_m]$ | $\phi(V_{1(1)})$ | $\phi(V_{2(0)}')$ | $A(V_{1(1)})$ | $(\phi(V_{1(1)}) + \phi(V_{2(0)}'))/2$ | $(A(V_{1(1)}) + A(V_{2(0)}'))/2$ |
| 4 | $[p1\ p2 \ldots pm] \pm \pi/m$ | $\phi(V_{2(1)}')$ | $\phi(V_{1(1)})$ | $A(V_{2(1)}')$ | $(\phi(V_{1(1)}) + \phi(V_{2(1)}'))/2$ | $(A(V_{1(1)}) + A(V_{2(1)}'))/2$ |
| 5 | $[p_1\ p_2 \ldots p_m]$ | $\phi(V_{1(2)})$ | $\phi(V_{2(1)}')$ | $A(V_{1(2)})$ | $(\phi(V_{1(2)}) + \phi(V_{2(1)}'))/2$ | $(A(V_{1(2)}) + A(V_{2(1)}'))/2$ |

As can be seen, during successive measurement time frames, for each lockstep pair of a calculated amplitude and a delayed calculated amplitude, one of the calculated amplitude and delayed calculated amplitude constitutes an amplitude correction for the other, because the frame buffer alternately stores amplitudes calculated in relation to the first set of phase values and the second set of phase values.

In another example (FIG. 5), another modified apparatus 500 estimates amplitude error using differences in phase angles between pairs of temporally adjacent vector measurements. As such, instead of providing the second summation unit 404, the second delay unit 406 and the second divider 408 of FIG. 4, the output of the first frame buffer 150 is also coupled to a first input of a first subtraction unit 502, a second input of the first subtraction unit 502 being coupled to the output of the arctan unit 146. An output of the first subtraction unit 502 is coupled to a first input of a lookup table unit 504. The output of the first divider 152 is coupled to an input of an interval calculation unit 506, an output of the interval calculation unit 506 being coupled to a second input of the lookup table unit 504. A timing input of the lookup table unit 504 is coupled to the first synchronisation output 136 of the timing control unit 134. An output of the lookup table unit 504 is coupled to a first input of third combiner, which in this example is a first multiplier unit 508. A second input of the first multiplier unit 508 is coupled to the output of the magnitude calculator 402. The first multiplier unit 508 provides corrected amplitudes at an output thereof. In this example, the lookup table unit 504, the interval calculation unit 506 and the first multiplier unit 508 constitute an amplitude correction unit 509.

In operation, corrected phase angles are calculated in the manner already described above in relation to FIG. 1. Corrected amplitudes are, however, calculated differently, because it has been discovered that phase error and amplitude error are dependent.

Figure 6:
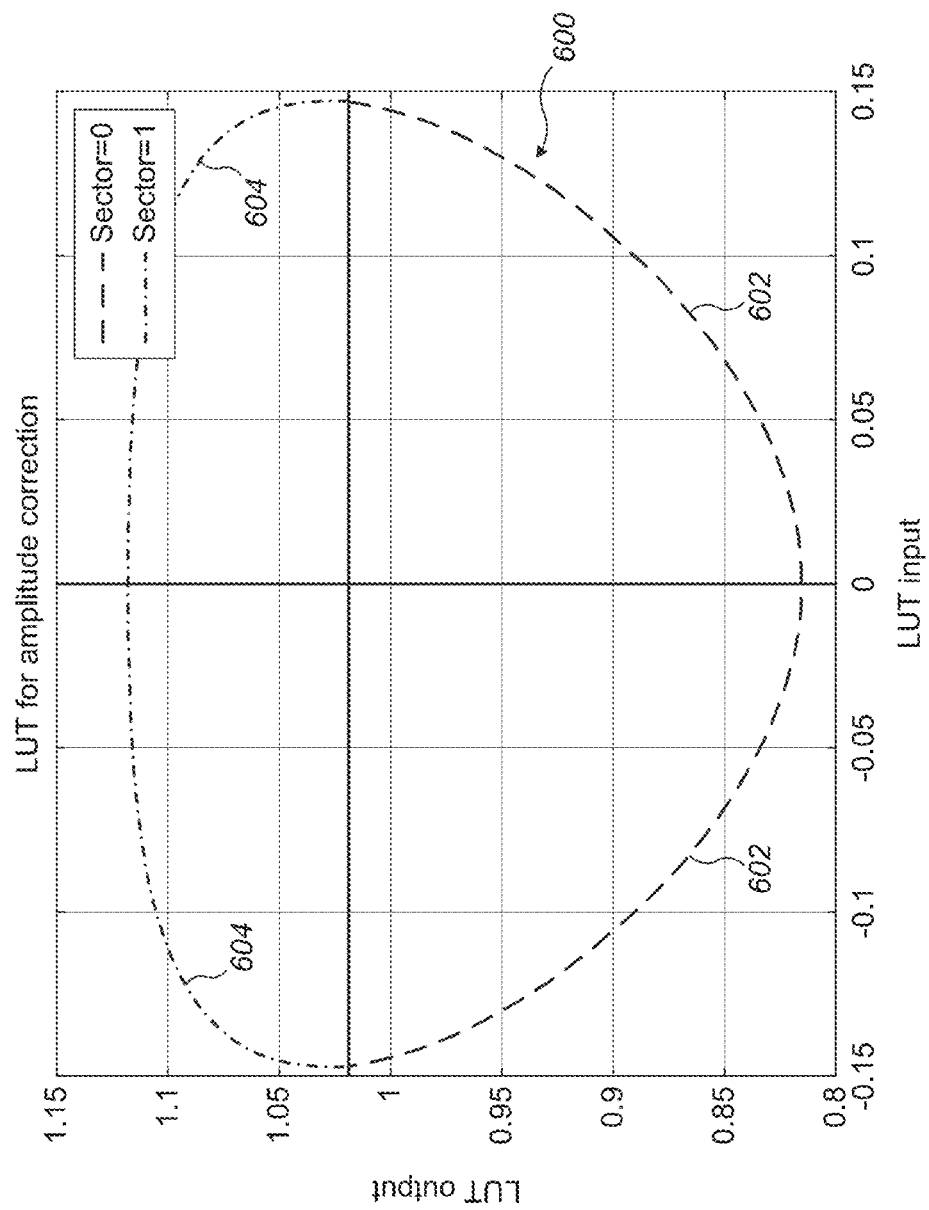
FIG. 6 is an amplitude correction graph associated with the apparatus of FIG. 5.

Referring to FIG. 6, the lookup table unit 504 stores data corresponding to an amplitude correction graph 600 of amplitude correction values versus angular error values. The amplitude correction graph 600 has two sectors: a first sector 602 and a second sector 604. Since the phase angle differences calculated conform to a periodic function, it is necessary to choose whether to use the value of the first sector 602 or the second sector 604 by identifying an interval value identifying the correct sector of the amplitude correction graph 600 to use. Consequently, owing to the periodic nature of the calculated phase angle differences, the interval calculation unit 506 separates the phase angle difference function into monotonic intervals and the interval determination is performed using the corrected phase angle provided at the output of the first divider 152.

The interval is calculated using the following expression:

$$\text{interval} = \text{mod}\left[\text{floor}\left(\frac{4\phi_{meas}}{\pi} + \frac{1}{2}\right), 2\right]$$

The above expression is, of course, in relation to the use of sets of 4-phases. However, the skilled person will appreciate that this expression can readily be expanded where a greater number of phases are used.

The sector is then determined by the interval calculation unit 506 as follows:

$$\text{sector} = \begin{cases} 0, & \text{if (interval} = 0 \text{ AND offset} = 0) \text{ OR (interval} = 1 \text{ AND offset} = \pi/m) \\ 1, & \text{else} \end{cases}$$

where the offset is the offset applied by the second phase signal generator 116. In the context of a 4-phase system, m is 4 in the above expression to determine the sector.

Using the above expressions, the interval calculation unit 506 obtains the corrected phase angle and determines from the corrected phase angle the interval. Based upon whether the phase offset, Trim is being applied or not and the determined interval, the interval calculation unit 506 determines whether the lookup table unit 504 should reference data relating to the first sector 602 or the second sector 604. Consequently, using each corrected phase angle output by the first divider 152, the interval calculation unit 506 calculates an interval and then determines a sector based upon the rules set out above the sector constituting a selection value with respect to the amplitude correction data stored by the lookup table unit 504. Thereafter, the lookup table unit 504 accesses stored data corresponding to the amplitude correction graph 600 of FIG. 6 constrained by the sector identified by the interval calculation unit 506, and applies an amplitude correction value to the first input of the first multiplier unit 508. In this regard, the first subtraction unit 502 calculates differences between temporally adjacent pairs of the plurality of angles calculated by the arctan unit 146 in order to provide angular errors to be looked up by the lookup table unit 504 in accordance with the condition imposed by the interval calculation unit 506. Substantially in synchronism, the first multiplier unit 508 receives a calculated amplitude and the received amplitude correction value is applied to the received calculated amplitude by the first multiplier unit 508 which outputs a corrected amplitude.

In a further example, the apparatus 100 is modified to yield a further apparatus 700. In this regard, the apparatus of FIG. 1 is modified by appending a motion compensation unit 702 to the output of the first divider 152. The motion compensation unit 702 comprises a third multiplexer 704 having a first input coupled to the output first divider 152 and a second input coupled to the output of the arctan unit 146. The output of the first divider 152 is also coupled to a first input of a second subtraction unit 706 and an output of the third multiplexer 704 is coupled to a second input of the second subtraction unit 706 via a third delay unit, which in this example is a third frame buffer 708. An output of the second subtraction unit 706 is coupled to an input of an absolute value calculation unit 710, an output of the absolute value calculation unit 710 being coupled to a variable input of a comparator 712. A reference input 714 of the comparator 712 is coupled to a source of a predetermined reference value, for example a motion threshold value. An output of the comparator 712 is coupled to a control input of the third multiplexer 704.

In operation, the motion compensation unit 702 serves to choose between providing a corrected angle calculated in the manner described above in relation to FIG. 1 or the calculated angle prior to correction. In this regard, by comparing a difference between a current corrected angle in respect of a current measurement frame and an output angle provided at the output of the third multiplexer 704 in respect of an immediately preceding measurement frame with a motion threshold, it is possible to measure inter-frame motion and hence whether an object in the scene is in motion sufficiently to distort the scene in the sense that an object appears twice in an image of the scene. In such circumstances, the corrected angle is erroneous and is discarded and the uncorrected phase angle is instead used as the output angle.

The difference calculated by the second subtraction unit 706 is therefore communicated to the absolute value calculation unit 710, which calculates the absolute value of the difference calculated by the second subtraction unit 706 in any given frame. Thereafter, the absolute value calculated by the absolute value calculation unit 710 is compared by the comparator 712 with the motion threshold. If the absolute value exceeds the motion threshold, the comparator 712 instructs the third multiplexer 704 to pass the uncorrected calculated angle as the output angle instead of the corrected angle. Alternatively, if the absolute value calculated is equal to or less than the motion threshold, then the comparator 712 instructs the third multiplexer 704 to pass the corrected angle as the output angle of the apparatus 700.

Figure 7:
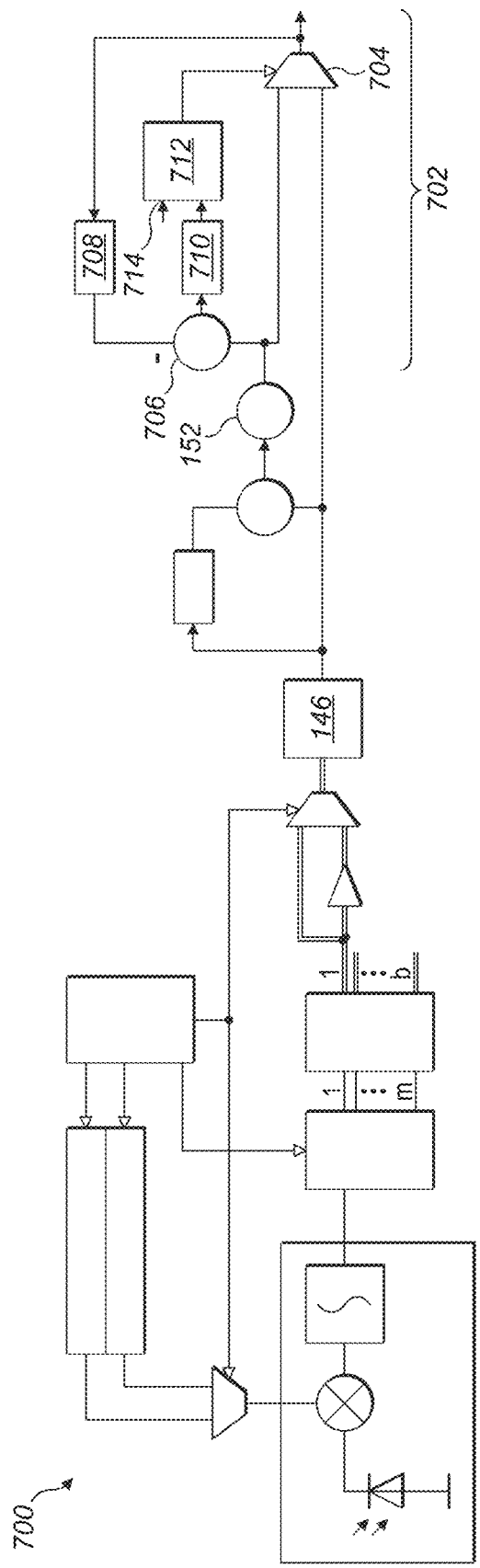
FIG. 7 is a schematic diagram of another modification to the apparatus of FIG. 1 and constituting yet a further embodiment of the invention.

In yet another example (FIG. 8), the principle employed in relation to the modified apparatus 700 of FIG. 7 can be expanded to modify the apparatus of FIG. 7 so as to provide another apparatus 800 that provides motion compensated amplitude values. In this regard, the functional elements of the example of FIG. 4 for the generation of corrected amplitudes set forth above are provided, but modified by providing a modified motion compensation unit 802, which is based upon the motion compensation unit 702 of FIG. 7, but additionally comprises a fourth multiplexer 804 having a first input coupled to the second divider 408 and a second input coupled to the output of the magnitude calculator 402. The output of the comparator 712 that is coupled to the control input of the third multiplexer 704 is also coupled to a control input of the fourth multiplexer 804. An output of the fourth multiplexer 804 provides motion compensated amplitudes as output amplitudes.

In operation, the difference between phase angles between frames is also used to determine whether an uncorrected calculated amplitude value should be passed as the output amplitude or a corrected amplitude present at the output of the second divider 408. Consequently, both the third and fourth multiplexers 704, 804 respond to the comparator 712 in order to allow uncorrected calculated angles and amplitudes to be the output angle and output amplitude, respectively, or corrected phase angles and corrected amplitudes to be the output angle and output amplitude, respectively. As in the previous example, the comparator 712 compares the absolute value calculated in relation to phase angles with the motion threshold in order to determine the actions of the third and fourth multiplexers 704, 804.

Figure 5:
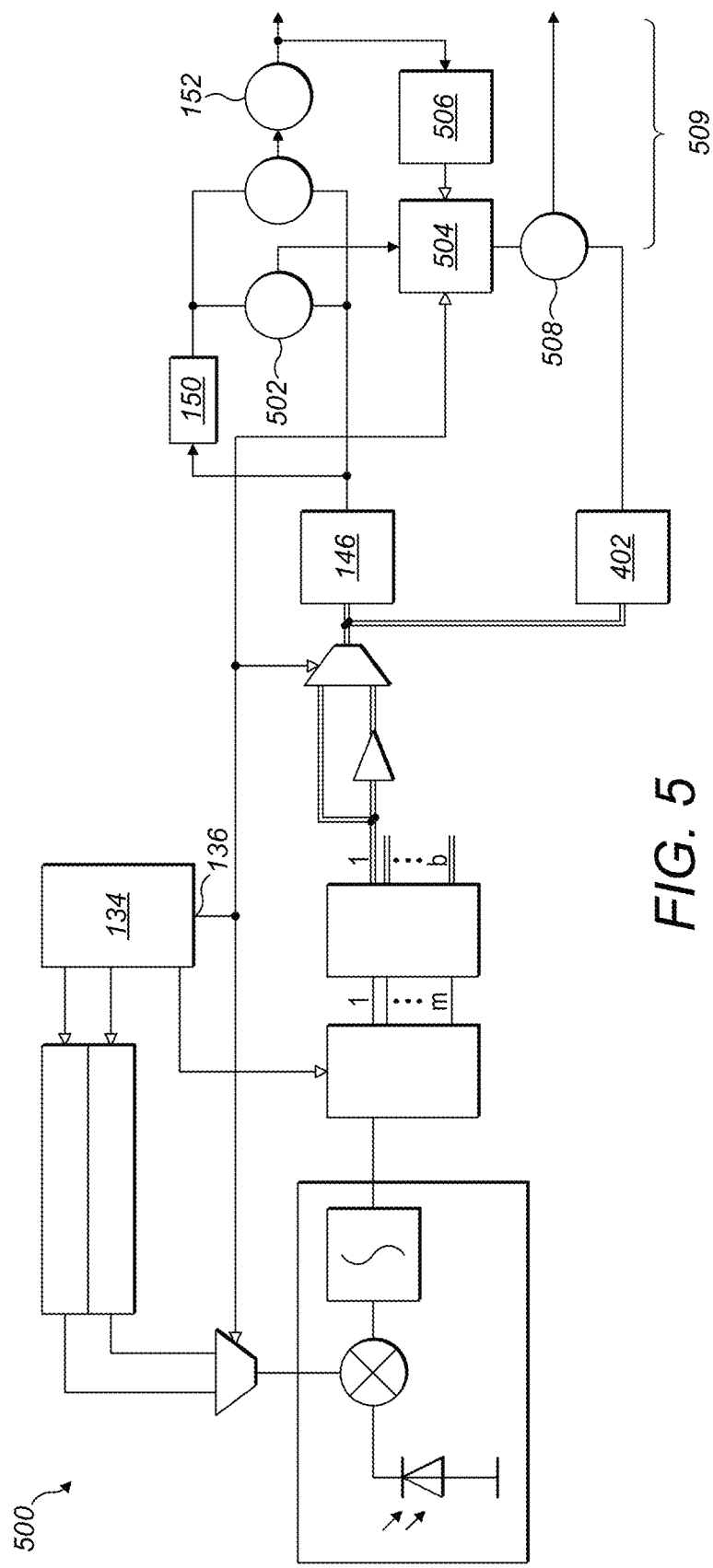
FIG. 5 is a schematic diagram of a modification to the apparatus of FIG. 4 and constituting yet another embodiment of the invention.
Figure 8:
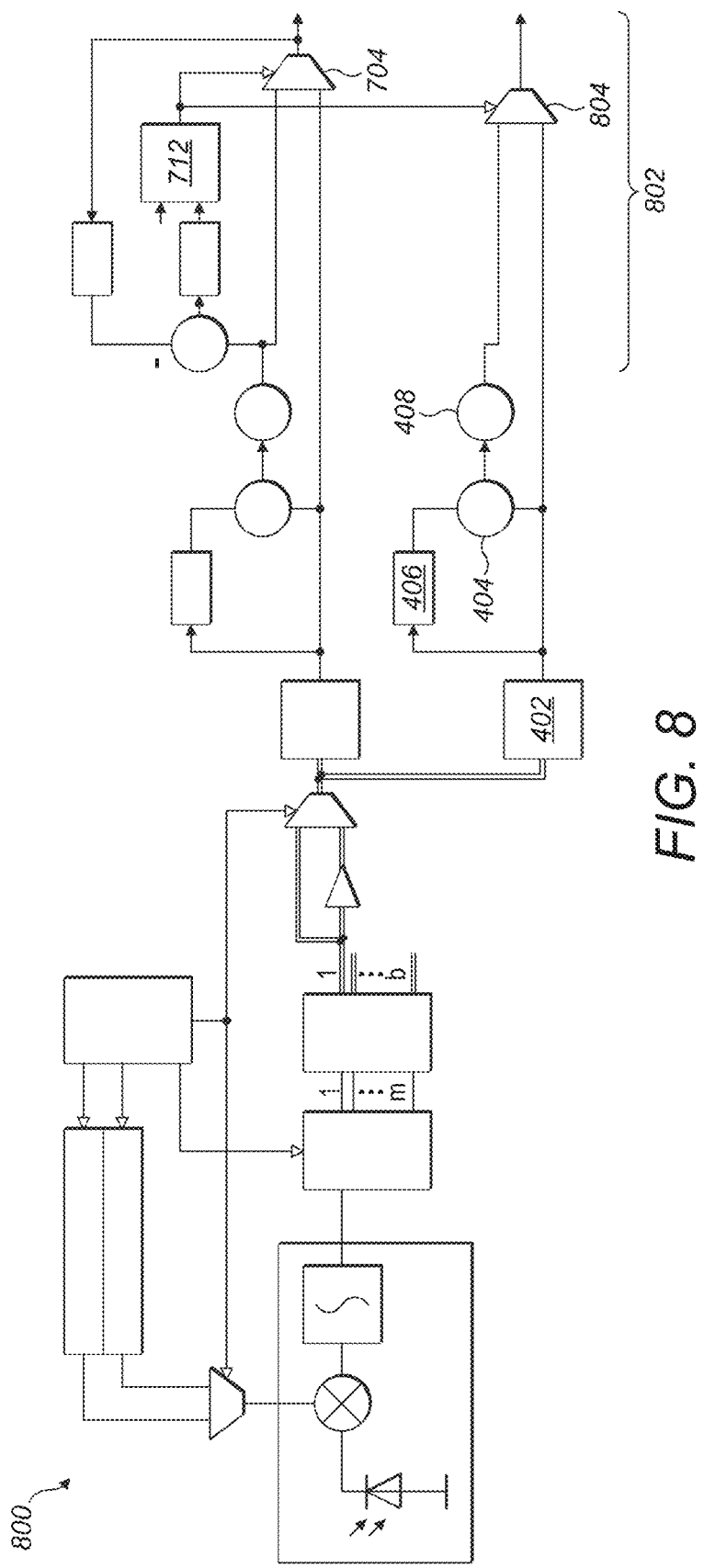
FIG. 8 is a schematic diagram of a modification to the apparatus of FIG. 7 and constituting another embodiment of the invention.
Figure 9:
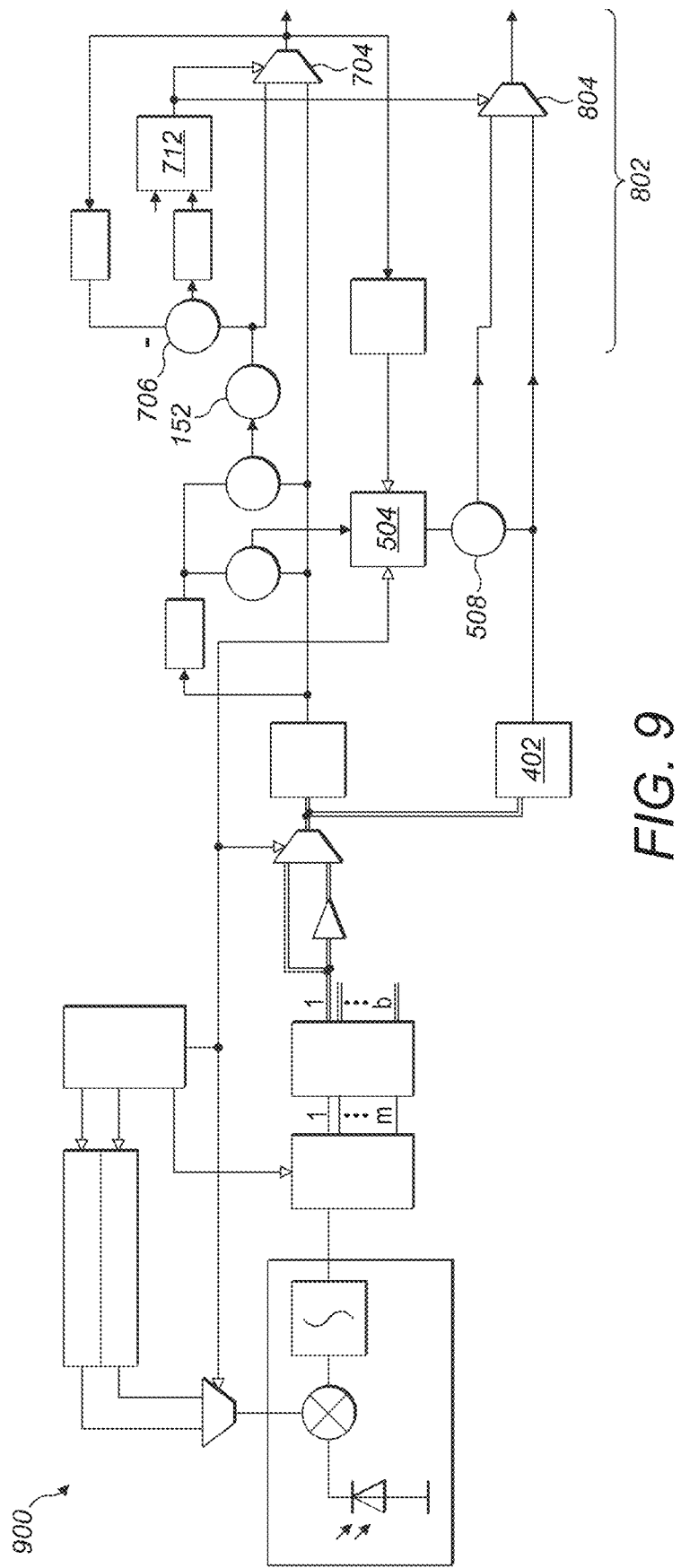
FIG. 9 is a schematic diagram of another indirect time of flight range calculation apparatus employing the modifications of FIGS. 5 and 8 and constituting a further embodiment of the invention.

In yet a further embodiment (FIG. 9), the apparatus of FIG. 5 is modified by employing the modified motion compensation unit 802 of FIG. 8 in order to provide motion compensation to the example of FIG. 5 and therefore a further modified apparatus 900. In this regard, the output of the first divider 152 is coupled to the first input of the second subtraction unit 706 of the modified motion compensation unit 802. Differing from the apparatus 800 of FIG. 8, the first input of the fourth multiplexer 804 of the modified motion compensation unit 802 is coupled to the output of the first multiplier unit 508, which provides corrected amplitudes. The second input of the fourth multiplexer 804 is, as in relation to FIG. 8, coupled to the output of the magnitude calculator 402.

In operation, the apparatus 900 generates both corrected angles and uncorrected calculated angles, which are processed in a like manner to that described above in relation to FIG. 8. Differences between output angles from consecutive measurement frames are therefore calculated and absolute values thereof compared with a motion threshold value in order to determine whether the output angle of the apparatus 900 should be a corrected angle or an uncorrected calculated angle by controlling the third multiplexer 704 accordingly in the manner already described above in relation to FIGS. 7 and 8. As in relation to FIG. 8, the result of the comparison by the comparator 712 is used to select either the corrected amplitude generated with the assistance of the lookup table unit 504 or the uncorrected amplitude calculated by the magnitude calculator 402, the selected source of amplitude values serving as the output amplitude of the apparatus 900 in respect of the current measurement frame and substantially in synchronism with the selection of the source of angle values.

The skilled person should appreciate that the above-described implementations are merely examples of the various implementations that are conceivable within the scope of the appended claims. Indeed, it should be appreciated that, for example, in some examples the vector de-rotation unit 128 is employed to de-rotate vectors selectively prior to combination. However, in other embodiments, the vector de-rotation can be implemented in the DFT unit 124 instead of providing a separate dedicated de-rotation unit.

In other embodiments, the phase buffer 110 and hence parallel processing of the buffered phase measurements obtained from the photonic mixer pixel device 102 in series can be omitted. In such embodiments, serial transfer of the phase measurements can be performed directly to the DFT unit 124, thereby reducing memory requirements for the detection and ranging module. In this respect, the DFT unit 124 can be provided with smaller internal buffers to calculate, for each frame cycle, intermediate I and Q values for the respective phase measurements received in series, which are accumulated over the frame cycle to generate final I and Q value results. In order to support this arrangement, the DFT unit 124 is operably coupled to the timing control unit 134 to maintain synchronisation of data processing. Operation of such an arrangement would omit the buffer storage operation (Step 202) and vectors (for example the first and second vectors $V_1$, $V_2$) can be calculated iteratively using the DFT unit 124 in respect of each incoming phase measurement.

It should be appreciated that references herein to "light", other than where expressly stated otherwise, are intended as references relating to the optical range of the electromagnetic spectrum, for example, between about 350 nm and about 2000 nm, such as between about 550 nm and about 1400 nm or between about 600 nm and about 1000 nm.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A method of calculating a phase angle in accordance with an indirect time of flight range calculation technique, the method comprising:
   a light source emitting light in accordance with the indirect time of flight measurement technique;
   a photonic mixer cell generating and storing a first plurality of electrical output signals respectively corresponding to a first plurality of predetermined phase values applied in accordance with the indirect time of flight measurement technique;
   a signal processing resource processing the first plurality of electrical output signals in accordance with the indirect time of flight measurement technique in order to calculate a first vector and a first angle from the first vector;
   the photonic mixer cell generating and storing a rotated second plurality of electrical output signals corresponding to a second plurality of predetermined phase values applied in accordance with the indirect time of flight measurement technique;
   the signal processing resource processing the rotated second plurality of electrical output signals in accordance with the indirect time of flight measurement technique in order to calculate a rotated second vector;
   the signal processing resource de-rotating the rotated second vector calculated and calculating a second angle from the de-rotated second vector, and to offset the second angle calculated against the first angle calculated in order to generate a corrected output angle; wherein
   each phase value of the second plurality of predetermined phase values is respectively offset with respect to each phase value of the first plurality of predetermined phase values by a predetermined phase offset value.

2. An indirect time of flight range calculation apparatus comprising:
   a light source configured to emit light in accordance with an indirect time of flight measurement technique;
   a photonic mixer cell configured to generate and store a first plurality of electrical output signals respectively corresponding to a first plurality of predetermined phase values applied in accordance with the indirect time of flight measurement technique;

a signal processing circuit configured to process the first plurality of electrical output signals in accordance with the indirect time of flight measurement technique in order to calculate a first vector and a first angle from the first vector; wherein the photonic mixer cell is configured to generate and store a rotated second plurality of electrical output signals corresponding to a second plurality of predetermined phase values applied in accordance with the indirect time of flight measurement technique;

each phase value of the second plurality of predetermined phase values is respectively offset with respect to each phase value of the first plurality of predetermined phase values by a predetermined phase offset value;

the signal processing circuit is configured to process the rotated second plurality of electrical output signals in accordance with the indirect time of flight measurement technique in order to calculate a rotated second vector;

the signal processing circuit is further configured to de-rotate the rotated second vector calculated and calculate a second angle from the de-rotated second vector, and to offset the second angle calculated against the first angle calculated, thereby generating a corrected output angle; and the signal processing circuit is configured to calculate a range using the corrected output angle.

3. The apparatus according to claim 2, wherein the signal processing circuit comprises:
a Digital Fourier Transform unit configured to generate a de-rotated output signal in respect of a fundamental frequency from the rotated second plurality of electrical output signals; and
an angle calculator configured to calculate the second angle using the de-rotated output signal.

4. The apparatus according to claim 2, wherein the signal processing circuit comprises:
a Digital Fourier Transform unit configured to receive the first plurality of electrical output signals and to generate a first output signal in respect of a fundamental frequency from the first plurality of electrical output signals, and to receive the rotated second plurality of electrical output signals and to generate a rotated second output signal in respect of a fundamental frequency from the second plurality of electrical signals; and
a vector de-rotator operably coupled to the Digital Fourier Transform unit and configured to receive the rotated second output signal and to de-rotate the rotated second output signal.

5. The apparatus according to claim 2, wherein
the signal processing circuit is configured to generate a plurality of calculated angles, the plurality of calculated angles comprising an alternation of angles calculated using the first plurality of predetermined phase values and the second plurality of predetermined phase values, the plurality of calculated angles comprising the first angle and the second angle.

6. The apparatus according to claim 5, wherein
the signal processing circuit is configured to generate a plurality of calculated amplitudes, the plurality of calculated amplitudes comprising an alternation of amplitudes calculated using the first plurality of predetermined phase values and the second plurality of predetermined phase values; and the apparatus further comprises:
an amplitude correction unit configured to receive the plurality of calculated amplitudes and to combine pairs of temporally adjacent calculated amplitudes of the plurality of calculated amplitudes.

7. The apparatus according to claim 6, wherein the amplitude correction unit comprises another frame buffer configured to delay the plurality of calculated amplitudes, thereby providing a plurality of delayed calculated amplitudes separate from the plurality of calculated amplitudes and arranged with the plurality of calculated amplitudes in parallel lockstep pairs.

8. The apparatus according to claim 5, further comprising:
an angle correction unit configured to provide a plurality of corrected output angles, the angle correction unit also being configured to receive serially the plurality of calculated angles and to combine pairs of temporally adjacent calculated angles of the plurality of calculated angles.

9. The apparatus according to claim 8, wherein the angle correction unit further comprises:
a scaling unit configured to scale each combined pair of temporally adjacent calculated angles of the plurality of calculated angles.

10. The apparatus according to claim 9, wherein the scaling unit is a divider.

11. The apparatus according to claim 8, wherein
the angle correction unit is configured to generate a plurality of output angles;
the angle correction unit is configured to calculate a measure of inter-frame motion and to compare the measure of inter-frame motion with a predetermined motion threshold; and
the angle correction unit is configured to generate an output angle of the plurality of output angles by selecting as the output angle between a corrected output angle of the plurality of corrected output angles and a substantially contemporaneously available calculated angle of the plurality of calculated angles used to calculate the corrected output angle in response to the comparison of the measure of inter-frame motion with the predetermined motion threshold.

12. The apparatus according to claim 11, wherein
the signal processing circuit is configured to generate a plurality of calculated amplitudes, the plurality of calculated amplitudes comprising an alternation of amplitudes calculated using the first plurality of predetermined phase values and the second plurality of predetermined phase values; and the apparatus further comprises:
an amplitude correction unit configured to receive the plurality of calculated amplitudes and to calculate a plurality of corrected output amplitudes by combining pairs of temporally adjacent calculated amplitudes of the plurality of calculated amplitudes; and wherein
the amplitude correction unit is configured to select between a corrected output amplitude of the plurality of corrected output amplitudes and a substantially contemporaneous calculated amplitude of the plurality of calculated amplitudes used to calculate the corrected output amplitude, the selection being in response to the comparison of the measure of inter-frame motion with the predetermined motion threshold.

13. The apparatus according to claim 11, wherein the angle correction unit is configured to calculate the measure of inter-frame motion by calculating a difference between the corrected output angle and a preceding output angle of the plurality of output angles that immediately preceded the output angle.

14. The apparatus according to claim 8, wherein
the angle correction unit is configured to calculate differences between temporally adjacent pairs of the plurality of calculated angles to provide a plurality of angular error values; and
the signal processing circuit is configured to generate a plurality of calculated amplitudes, the plurality of calculated amplitudes comprising an alternation of amplitudes calculated using the first plurality of predetermined phase values and the second plurality of predetermined phase values; and the apparatus further comprises:
an amplitude correction unit configured to receive the plurality of calculated amplitudes and to correct each of the plurality of calculated amplitudes respectively in response to the plurality of angular error values, the plurality of angular error values being calculated substantially in synchronism with the plurality of calculated amplitudes.

15. The apparatus according to claim 14, further comprising:
a lookup table comprising a plurality of amplitude correction values referenced with respect to a plurality of angular error values, the lookup table being configured to be accessed to obtain an amplitude correction value from the plurality of amplitude correction values in response to an angular error value of the plurality of angular error values.

16. The apparatus as claimed in claim 15, further comprising:
the angle correction unit configured to provide a plurality of corrected output angles, the angle correction unit also being configured to receive serially the plurality of calculated angles and to combine pairs of temporally adjacent calculated angles of the plurality of calculated angles; wherein
the plurality of amplitude correction values comprises a first amplitude correction value and a second amplitude correction value, the first and second amplitude correction values corresponding to an angular error value of the plurality of angular error values; and the apparatus further comprises:
an interval calculator configured to receive the plurality of corrected output angles and to calculate a plurality of selection values in response thereto; and
the interval calculator is also configured to exclude one of the first amplitude correction values and the second amplitude correction values in response to a selection value of the plurality of selection values.

17. The apparatus according to claim 8, wherein the angle correction unit comprises a frame buffer configured to delay the plurality of calculated angles, thereby providing a plurality of delayed calculated angles separate from the plurality of calculated angles and arranged with the plurality of calculated angles in parallel lockstep pairs.

18. The apparatus according to claim 17, wherein an angular correction comprising, for each lockstep pair of a calculated angle and a delayed calculated angle, one of the calculated angle and delayed calculated angle.

19. The apparatus according to claim 17, further comprising:
a summation unit configured to combine each lockstep pair of the plurality of calculated angles and the plurality of delayed calculated angles.

20. The apparatus according to claim 19, further comprising:
a scaling unit configured to scale each combined pair of temporally adjacent calculated angles of the plurality of calculated angles; wherein
the summation unit and the scaling unit are configured to calculate an average of each lockstep pair of the parallel lockstep pairs of the plurality of calculated angles and the plurality of delayed calculated angles.

* * * * *